United States Patent
Yamazaki et al.

(10) Patent No.: US 6,285,800 B1
(45) Date of Patent: Sep. 4, 2001

(54) APPARATUS AND METHOD FOR PROCESSING IMAGE

(75) Inventors: Tsutomu Yamazaki, Sagamihara; Naoki Toyoshi, Toyohashi; Kentaro Katori; Shinichi Takemoto, both of Toyokawa, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/179,435

(22) Filed: Oct. 27, 1998

(30) Foreign Application Priority Data

Oct. 30, 1997 (JP) .................................................. 9-298305
Dec. 5, 1997 (JP) .................................................. 9-336085

(51) Int. Cl.$^7$ .................................................. H04N 1/405
(52) U.S. Cl. .......................................... 382/266; 382/199
(58) Field of Search ........................... 382/199, 266–269, 382/237; 358/1.9, 534–536, 455–458

(56) References Cited

U.S. PATENT DOCUMENTS

| 5,243,445 | * | 9/1993 | Koike | 358/462 |
| 5,978,554 | * | 11/1999 | Hakamada et al. | 395/109 |

FOREIGN PATENT DOCUMENTS

| 0562162 A1 | * | 9/1993 | (EP) . |
| 63-169174 | * | 7/1988 | (JP) . |
| 10-191054 | * | 9/1993 | (JP) . |
| 8-307690 | | 11/1996 | (JP) . |
| 9-191402 | | 7/1997 | (JP) . |

* cited by examiner

Primary Examiner—Thomas D Lee
Assistant Examiner—Stephen Brinich
(74) Attorney, Agent, or Firm—Sidley Austin Brown & Wood

(57) ABSTRACT

An apparatus and method for processing an image which are capable of producing a printed image satisfying both resolution and reproducibility of gradation. This method admits as an input the RGB data of the size of one pixel and converts this input into lightness data and density data. When a target pixel is determined to correspond to a non-edge portion, the method performs a computation for finding the remainder 1 of X/3 and the remainder m of Y/3 from the coordinates (X,Y) of the target pixel thereby deciding which of the total of nine pixels of a non-edge grade dither pattern is to be extracted, and allocates the position d(l,m) to the extracted pixel. On the other hand, when the target pixel is determined to correspond to an edge portion, an edge grade dither pattern corresponding to the density of the target pixel is allocated directly to the target pixel. The processing of conversion into the non-edge grade dither pattern d(l,m) or the processing of conversion into the edge grade dither patter which is performed as described above is carried out on all the pixels which have been read, depending on the determination of whether the target pixel corresponds to the non-edge portion or the edge portion, and the converted data obtained consequently is emitted.

40 Claims, 8 Drawing Sheets

NON-EDGE GRADE DITHER PATTERN
(MATRIX SIZE 6 × 24)

EDGE GRADE DITHER PATTERN
(MATRIX SIZE 2 × 8)

MINIMUM PRINT UNIT (600×2400dpi)

MINIMUM READ UNIT (300×300dpi)

NON-EDGE GRADE DITHER PATTERN (MATRIX SIZE 6×24)

EDGE GRADE DITHER PATTERN (MATRIX SIZE 2×8)

| 7 | 9 | 11 | 13 | 15 | 1 | 3 | 5 |
|---|---|----|----|----|---|---|---|
| 16 | 2 | 4 | 6 | 8 | 10 | 12 | 14 |

EDGE GRADE DITHER PATTERN

PIXEL OF 300dpi

APPARATUS AND METHOD FOR PROCESSING IMAGE

BACKGROUND OF THE INVENTION

1. Field of the Invention

This invention relates to an apparatus and a method for processing an image which allows an improvement in the resolution of an edge portion and fine lines of the image while enabling the reproducibility of gradation of a non-edge portion of the image to be maintained.

2. Description of Related Art

Various techniques for enabling the image of an original document read out by such an image reading device as the scanner to be reproduced as faithfully as permissible in the form of a printed image have been heretofore proposed.

One of these techniques which is disclosed in JP-A-09-191,402, for example, comprises preparing two matrixes different in resolving power and identical in size and selecting either of the matrixes which conforms the characteristic to be required of a relevant image thereby effecting the maintenance of the resolving power in a region in need of the resolving power and attaining the reproducibility of gradation in a region in need of reproducibility of gradation.

When such an area gradation reproduction method as mentioned above is adopted, however, an effort to obtain the reproducibility of gradation in a wide range generally results in inevitably creating discontinuous contours between an edge portion and fine lines of the image resulting in a rugged sensation and degrading the resolution thereof. Conversely, when important consideration is given to the resolution, the problem of having to sacrifice the reproducibility of gradation arises in spite of the advantage that the edge portion and fine lines are reproduced with clearly defined contours.

SUMMARY OF THE INVENTION

This invention, initiated as motivated in light of such disadvantages of the conventional apparatus and method for processing an image as mentioned above, has for a main object thereof the provisions of an apparatus and a method for processing an image which are capable of performing on the image the processing optimum for the characteristic of the image.

Another object of this invention is to provide an apparatus and a method for processing an image which are capable of performing on the image the processing in conformity with the characteristic of the image without impairing the gradation and the resolution.

A further object of this invention is to provide an apparatus and a method for processing an image which are capable of realizing the processing optimum for the characteristic of the image with a simple construction.

According to one aspect of the invention, an image processing apparatus is provided for converting M gradation image data into N gradation image data, wherein N is less than M, comprising determining means, based on the M gradation image data of a target region, for determining whether the target region corresponds to an edge portion or to a non-edge portion and processing means, based on the determination by said determining means, for generating the N gradation image data of the target region by using a first matrix in a case where the target region corresponds to the edge portion and for generating the N gradation image data of the target region by using a part of a second matrix in a case where the target region corresponds to the non-edge portion.

According to another aspect of the invention, an image processing method is provided for converting M gradation image data into N gradation image data, wherein N is less than M, comprising the steps of (a) determining, based on the M gradation image data of a target region, whether the target region corresponds to an edge portion or to a non-edge portion, and selectively, (b-1) generating the N gradation image data of the target region by using a first matrix in a case where the target region corresponds to the edge portion in accordance with the determination in the step (a), and (b-2) selecting one of a plurality of parts of a second matrix and generating the N gradation image data of the target region by using the selected part of the second matrix in a case where the target region corresponds to the non-edge portion in accordance with the determination in the step (a).

According to still another aspect of the invention, storage is provided for storing a computer readable program with which a computer executes a process including the steps of (a) determining, based on M gradation image data of a target region, whether the target region corresponds to an edge portion or to a non-edge portion, and selectively, (b-1) generating N gradation image data of the target region by using a first matrix in a case where the target region corresponds to the edge portion in accordance with the determination in the step (a), and (b-2) selecting one of a plurality of parts of a second matrix and generating the N gradation image data of the target region by using the selected part of the second matrix in a case where the target region corresponds to the non-edge portion in accordance with the determination in the step (a), wherein N is less than M.

According to a further aspect of the invention, an image processing apparatus is provided for converting M gradation image data into N gradation image data, wherein N is less than M, comprising determining means for determining an attribute of the M gradation image data of a target region and for generating a composite data of the target region from the M gradation image data and the attribute of the target region and processing means, based on the composite data of the target region, for generating the N gradation image data of the target region by using one of a plurality of matrixes, wherein the processing means selects the one of the plurality of matrixes based on the attribute included in the composite data of the target region.

According to a still further aspect of the invention, an image processing method is provided for converting M gradation image data into N gradation image data, wherein N is less than M, comprising the steps of (a) determining an attribute of the M gradation image data of a target region, (b) generating a composite data of the target region from the M gradation image data and the attribute of the target region, (c) selecting one of a plurality of matrixes based on the attribute included in the composite data of the target region and (d) generating, based on the composite data of the target region, the N gradation image data of the target region by using the matrix selected in the step (c).

DESCRIPTION OF THE PREFERRED EMBODIMENTS

Now, the embodiments of this invention will be described in detail below by reference to the accompanying drawings.

Figure 1:
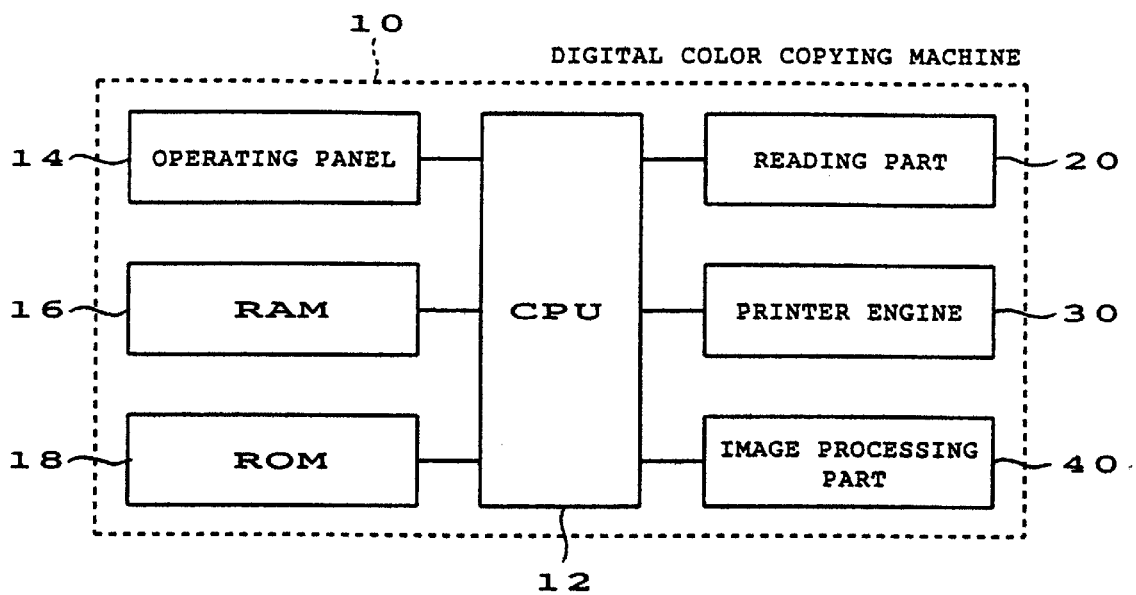
FIG. 1 is a block diagram illustrating schematically the construction of an image processing apparatus according to the present invention.

FIG. 1 is a block diagram illustrating schematically an image processing apparatus for executing the image processing method according to this invention. This embodiment will be depicted with reference to a digital color copying machine 10, for example. It can be applied to not only a monochromic digital copying machine but also other image processing devices such as, for example, the scanner/printer system and the personal computer (irrespective of the distinction between color and monochrome).

As illustrated in the diagram, the digital color copying machine 10 is provided with a CPU 12, an operating panel 14, a RAM 16, A ROM 18, a reading part 20, a printer engine 30, and an image processing part 40.

The CPU 12 possesses the function of collectively controlling the operation of the digital color copying machine 10 and is adapted to effect various controls based on an operation program memorized in the ROM 18.

The operating panel 14 is a part for designating a specific operation of the digital color copying machine 10. It designates, for example, the number of prints to be obtained by printing and the enlargement or contraction of the size of an image to be printed.

The RAM 16 is intended as temporary storage such as of setting on the operation panel 14.

Figure 2:
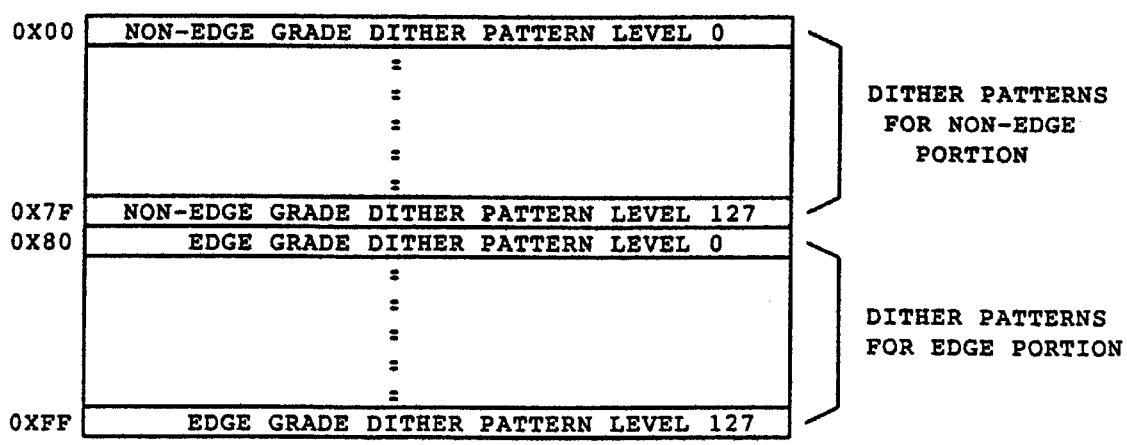
FIG. 2 is a diagram illustrating the state in which non-edge grade dither pattern and edge grade dither pattern memorized in the apparatus of FIG. 1 are accommodated.

The ROM 18 is intended to enable dither patterns for a non-edge portion and dither patterns for an edge portion used to perform the area gradation processing in the method of this invention to be stored as a dither pattern grade lookup table. Incidentally, this dither pattern grade lookup table, as illustrated in FIG. 2, is assigned addresses and stored in the ROM 18, with the dither patterns for the non-edge portion and those for the edge portion prepared equally in 128 kinds.

Figure 5A:
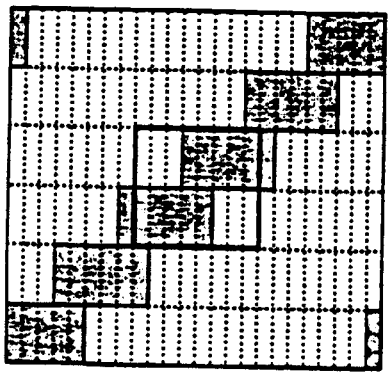
FIG. 5A is a diagram illustrating one example of the non-edge grade dither pattern.
Figure 5B:
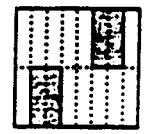
FIG. 5B is a diagram illustrating one example of the edge grade dither pattern.

Examples of the non-edge grade dither patterns and the edge grade dither patterns are illustrated respectively in FIG. 5A and FIG. 5B. They are prepared in varying colors.

The reading part 20, furnished with a reading resolution of 300 dpi×300 dpi, is capable of reading an image with the data of 8 bits per each color (RGB), namely 24 bits per pixel.

The printer engine 30 is a binary printer engine which is capable of printing an image in the four colors of CMYK with a resolution of 600 dpi×2400 dpi.

The image processing part 40 is endowed with such functions as converting the 8-bit RGB data emitted from the reading part 20 into the binary data for emission to the printer engine 30 and performing the detection of the edge portion.

In this digital color copying machine 10, therefore, the image of an original document read out by the reading part 20 is given area gradation processing by the image processing part 40 in accordance with the table of ROM 18.

Figure 3A:
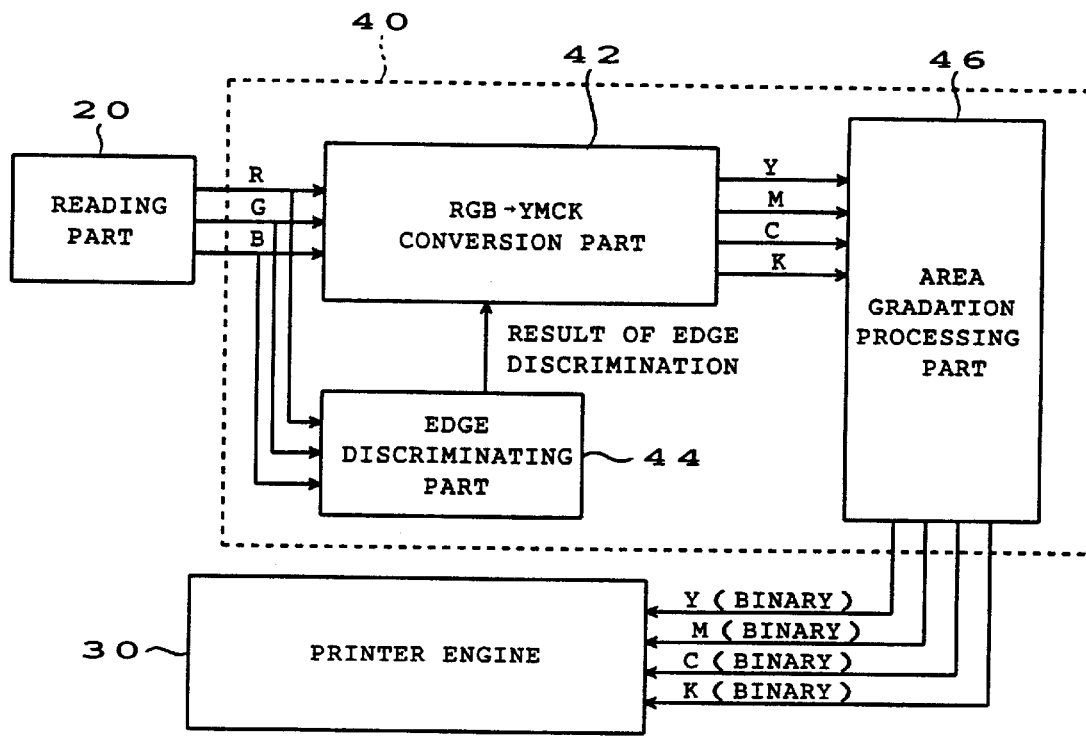
FIG. 3A is a block diagram illustrating a construction of an image processing part of the apparatus shown in FIG. 1.

FIG. 3A is a block diagram illustrating in further detail the construction of the image processing part 40 of FIG. 1.

The image processing part 40 is provided with an RGB→YMCK conversion part 42, an edge discriminating part 44, and an area gradation processing part 46. It has a construction such that the RGB signal from the reading part 20 may be injected into the RGB→YMCK conversion part 42 and the binary signal of each of the colors of YMCK emitted from the area gradation processing part 46 may be issued to the printer engine 30.

The RGB→YMCK conversion part 42 is intended for admitting as an input the 8-bit RGB data of a resolution of 300 dpi emitted from the reading part 20 and converting the RGB data into a 7-bit density data of each of the colors of YMCK.

The edge discriminating part 44 is intended for admitting as an input the 8-bit RGB data of the resolution of 300 dpi emitted from the reading part 20, selecting one arbitrary pixel from the data as a target pixel (pixel for reading), and determining whether or not the target pixel corresponds to the edge portion.

This determination on the identity as to the edge portion is accomplished by first converting the RGB data admitted into a lightness data, computing the primary differential and the secondary differential with respect to the target pixel in an arbitrary matrix thereby determining the amount of change in lightness, and deciding that the target pixel corresponds to the edge portion when this magnitude of change is not less than a certain threshold.

As the signal indicating the result of the edge discrimination, the signal HI is issued when the discrimination of the edge portion performed as described above finds the target pixel to correspond to the edge portion or the signal LOW is issued when the discrimination finds the target pixel not to correspond to the edge portion. Incidentally, this signal indicating the result of the edge discrimination is issued to the RGB→YMCK conversion part 42, added to the most significant bit of the 7-bit data of each of the colors YMCK emitted from the RGB→YMCK conversion part 42, and introduced as an input into the area gradation processing part 46. As a result, the ROM 18 issues the edge portion grade dither patterns from the address 0X80 upward when the target pixel corresponds to the edge portion or the non-edge portion grade dither patterns from the address 0X7F downward when the target pixel does not correspond to the edge portion to the area gradation processing part 46 (FIG. 2 refers).

While the embodiment, as depicted above, converts the 8-bit RGB data (256 gradation) of each color into the 7-bit YMCK signal of the relevant color (the number N of gradation to be reproduced=128 gradation), it is not particularly necessary to subject the image data which has been read to conversion into the 7-bit density data as described above. The gradation number of the image data being handled may be kept intact instead while the image data is being processed. Specifically, by adopting the construction of an image processing part 40' illustrated in FIG. 3B in the place of the construction of the image processing part 40 illustrated in FIG. 3A, the 8-bit RGB data (256 gradation) may be converted into an 8-bit YMCK signal (256 gradation) as it is and separately from this 8-bit signal one bit of the signal indicating the result of the edge discrimination may be added and issued to an area gradation processing part 46'.

Figure 3B:
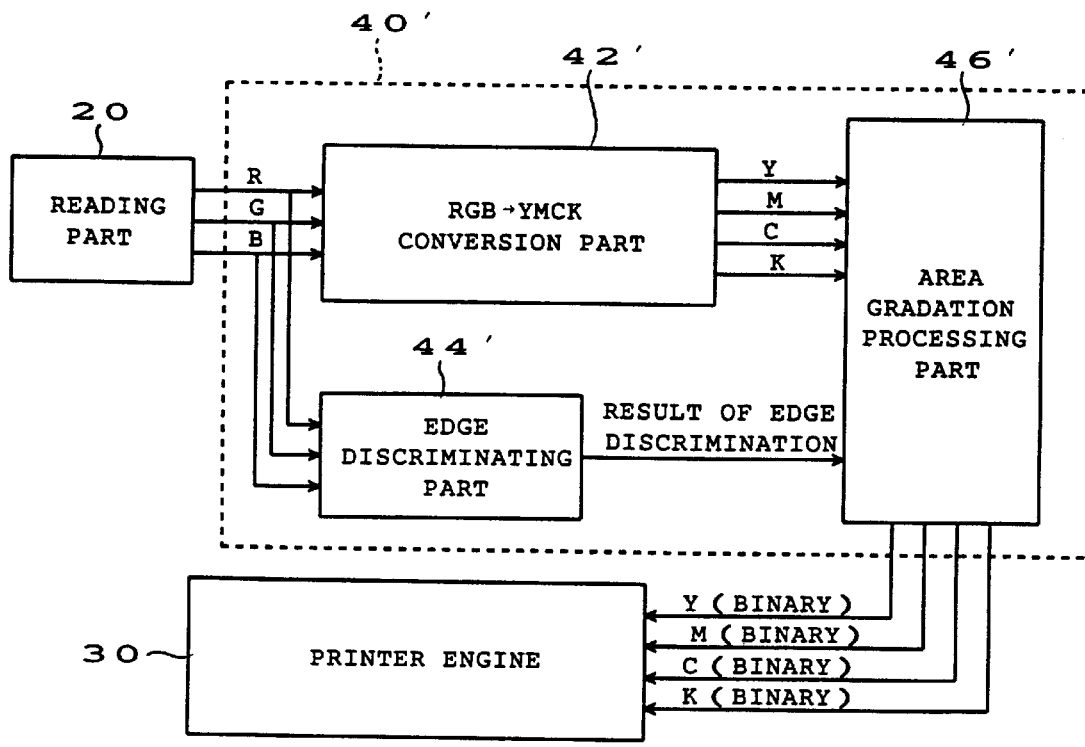
FIG. 3B is a block diagram illustrating another construction of the image processing part of the apparatus shown in FIG. 1.

So far as the discrimination of the edge of each pixel is concerned, it is allowed to adopt arbitrarily either of the constructions of image processing part illustrated in FIG. 3A and FIG. 3B. The construction of FIG. 3A, however, can be simplified in construction as compared with the construction of FIG. 3B because it permits a decrease in the number of input terminals required for the image gradation processing part. Further, the construction of FIG. 3A can simplify the processing which is performed in the image gradation processing part because it is capable of discerning the result of the edge discrimination by simply referring to the most significant bit in each 8-bit data to be introduced.

The area gradation processing part 46 is intended for introducing the 7-bit data of each of the colors YMCK emitted from the RGB→YMCK conversion part 42 and the 1-bit data indicating the result of the edge discrimination emitted from the edge discriminating part 44 and converting the 8-bit data (1-bit data indicating the result of edge discrimination and 7-bit density data) of 300 dpi into the dither pattern of 2×8 dots (which will be described specifically herein below) by reference to the edge portion grade dither patterns or the non-edge portion grade dither patterns of the ROM 18 based on the result of the edge discrimination.

The printer engine 30 is endowed with the ability to print with the minimum print unit of 600 dpi×2400 dpi based on the binary data of each of the colors of YMCK produced by the conversion in the area gradation processing part 46.

Figure 4:
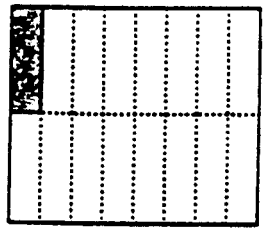
FIG. 4 is a diagram to aid in the description of the minimum print unit and the minimum read unit.

In the present embodiment, the reading part 20 is capable of reading an image with the minimum read unit (reading resolution) of 300 dpi×300 dpi and the printer engine 30 is capable of printing an image with the minimum print unit (print density) of 600 dpi×2400 dpi as illustrated in FIG. 4. In the case of producing a print, therefore, the image which has been read can be printed with 16 dots per pixel thereof and the 16-gradation density expression (namely x=16) can be attained by preparing 16 kinds of dither patterns respectively assigned to the 16 dots mentioned above depending on the dot to print. In other words, the expression can be attained with the gradation of only 16 levels.

This capacity of gradation can be achieved by increasing the unit size of the matrixes forming the dither patterns. This increase of the unit size, however, results in degrading the resolution.

When a matrix size formed by the unit of three pixels in both the longitudinal and the lateral direction (total of nine pixels) (the size of 6×24 and equivalent to nine times the matrix size of FIG. 4) is adopted for achieving the capacity of gradation, for example, the expression can be attained in 144 gradation because there exist 6*24=144 minimum print units (dots). In the present embodiment, the processing for conversion of the non-edge portion is attained by setting the matrix size just mentioned (FIG. 5A refers) as the dither pattern for the non-edge portion.

When this processing is performed to such an extent as to cover even the edge portion, the spaces between the dots (the minimum print units occurring as blackened portions within the matrix) expressing dither patterns are expressed as enlarged to a point where the resolution is inevitably degraded and the edge portions of a character or a line consequently emit a rugged sensation, though depending on the density of the pixels read out and particularly where the density is low.

In this embodiment, therefore, the edge portion adopts an edge portion grade dither pattern having a matrix size of 2×8 per read pixel unit for the purpose of improving the resolution in the edge portion (FIG. 5B refers). Thus, this embodiment elects to augment the resolution in the edge portion at a slight sacrifice of the capacity of gradation (this dither pattern barely capable of expressing gradation only in 16 levels).

When this processing of conversion is performed on the edge portion, even characters and lines of low density are deprived of the rugged sensation and can be printed with sharp edges approximating closely to the edges of a letterpress.

As described above, this invention differentiates the method of reproducing area gradation (the dither pattern to be used) between the non-edge portion and the edge portion based on the result of the edge discrimination so as to satisfy both the capacity for gradation and the resolution as required.

Figure 6:
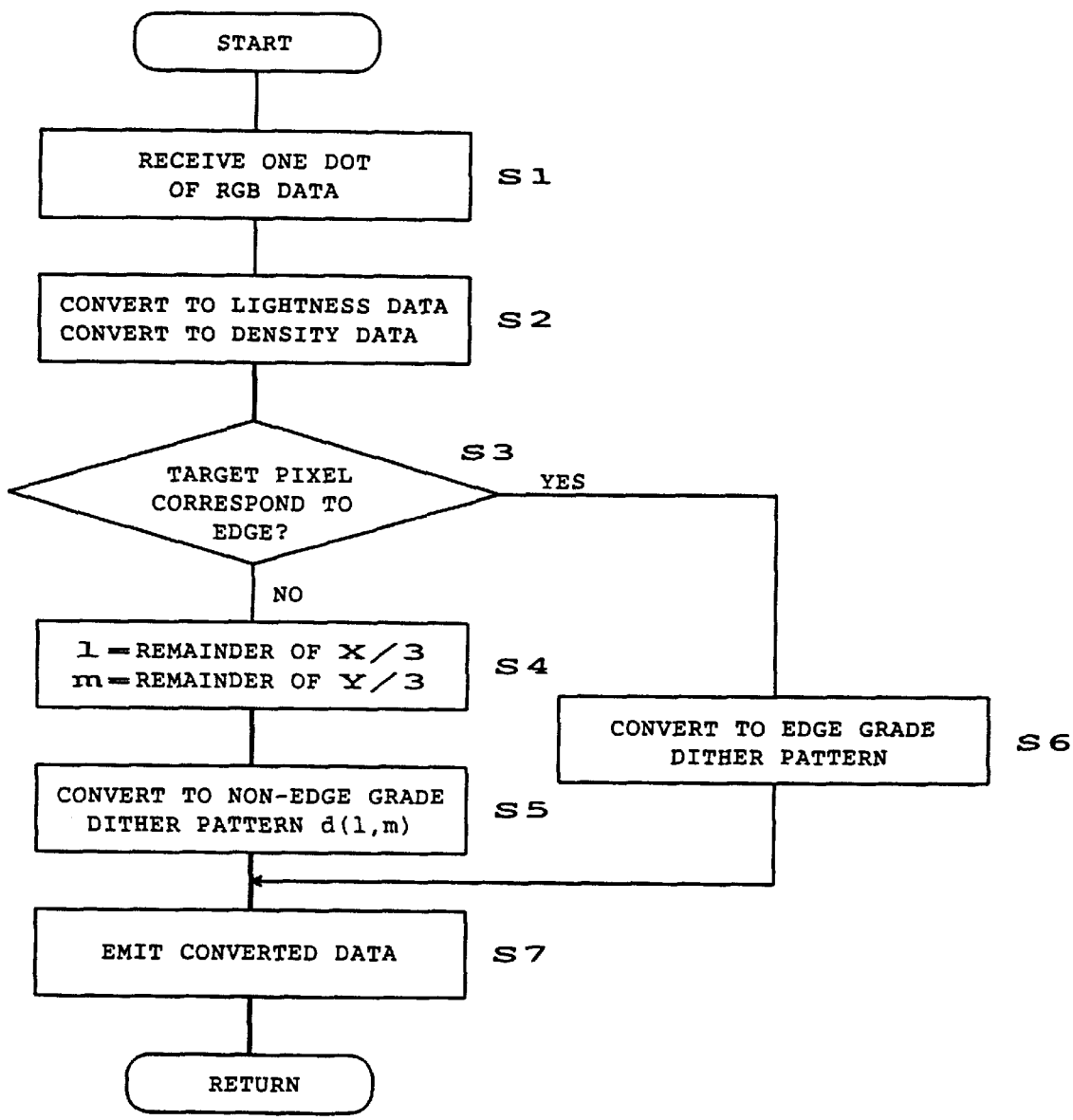
FIG. 6 is a flow chart illustrating a method for processing an image according to this invention.

Now, the method for image processing according to this invention will be described in detail below by reference to the flow chart of FIG. 6. This flow chart depicts the processing performed in the image processing part 40, i.e. a processing of changing the dither pattern by the unit of one pixel with respect to an image which has been read by the reading part 20. The procedure shown in this flow chart can be stored in a recording medium (such as, for example, a floppy disk, hard disk, or CD-ROM) which can be read by a computer and processed by the computer.

When the procedure shown in this flow chart is executed by a general-purpose personal computer, part of this procedure may be assigned to the operation system of this personal computer. In this case, the remainder of the procedure may be memorized in the recording medium.

This method will be described below by reference to the apparatus which is illustrated in FIG. 1 and FIG. 3.

The RGB→YMCK conversion part 42 introduces an 8-bit RGB data of each color (256 gradation) equivalent to one pixel of the output from the reading part 20 (S1) and converts this data into a lightness data and a density data (S2). Then, the area gradation processing part 46 examines the input signal indicating the result of the edge discrimination to determine whether the target pixel has been decided to correspond to the non-edge portion or to the edge portion. The discrimination of the target pixel between the non-edge portion and the edge portion is executed by the edge discriminating part 44. In this edge discriminating part 44, first the RGB data admitted therein is converted into a lightness data, the primary differential and the secondary differential are computed with respect to the target pixel in an arbitrary matrix to determine the amount of change in lightness with respect to the target pixel, and the target pixel is decided to correspond to the non-edge portion when this magnitude of change is less than a predetermined threshold or to correspond to the edge portion when the magnitude is not less than the threshold (S3).

It is a well-known fact and yet is stated herein for the sake of precaution that the differentiation to be performed with respect to the target pixel consults the image data of peripheral pixels of the target pixel. The expression "amount of change in lightness with respect to the target pixel" given above refers to the difference between the lightness data of the target pixel and the lightness data of the peripheral pixels.

Figures 7A, 7B:
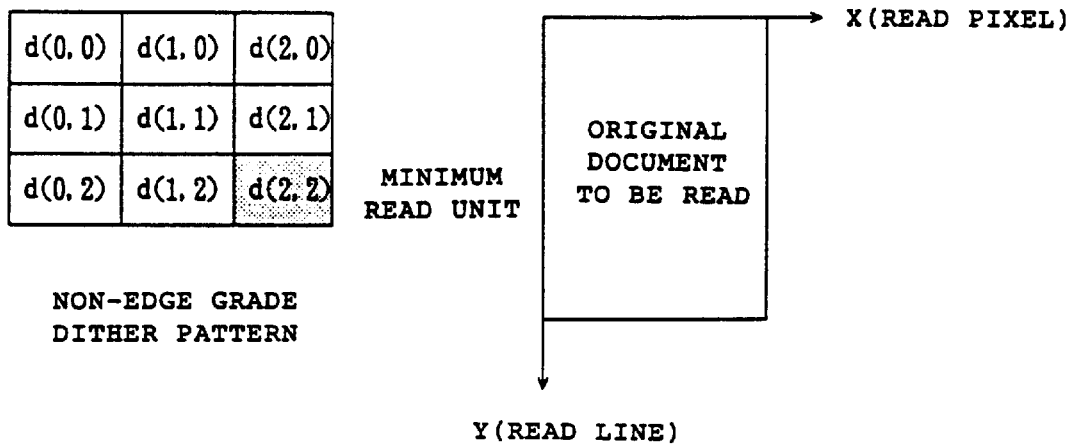
FIG. 7A and FIG. 7B are diagrams to aid in the description of the relation of correspondence between a target pixel and the non-edge grade dither pattern.

When the target pixel has been determined to correspond to the non-edge portion (LOW as the signal indicating the result of the edge discrimination), the processing for conversion to the non-edge grade dither pattern corresponding to the density data of the target pixel (one pixel) is carried out. This non-edge grade dither pattern is formed of 3*3=9 read pixels (a=b=3, n=9) as illustrated in FIG. 5A and FIG. 7A. In printing the relevant image, therefore, it becomes necessary to allocate only one of the nine pixels of the non-edge grade dither pattern as the lone target pixel and, therefore, to find by computation which of the nine pixels should be printed. The computation is required to determine to which of the positions from d(0,0) through d(2,2) of the non-edge grade dither pattern illustrated in FIG. 7A the position of the target pixel corresponds.

In performing this computation, first the non-edge dither pattern is sorted into sections by the read pixel unit as illustrated in FIG. 7A, the position in question is assumed to be d(l,m), and the coordinates of the position relative to the original document read out are assumed to be X in the unit of read pixel in the direction of main scanning and Y in the unit of read line in the direction of auxiliary scanning.

By assuming the definitions just mentioned, the target pixel on the original document to be read can be expressed by the coordinates (X,Y) and, based on the coordinates (X,Y), the position d(l,m) of the target pixel in the non-edge grade dither pattern can be decided. The area gradation processing part 46, therefore, finds by computation which of the nine pixels of the non-edge grade dither pattern is to be extracted and applied as the target pixel by carrying out the computation for determining the remainder l of X/3 and the remainder m of Y/3 from the coordinates (X,Y) of the target pixel and applies the pixel decided by the computation to the target pixel.

On the assumption that the pixel located at the coordinates (10,10) of an original document to be read as illustrated in FIG. 7B is a target pixel and the target pixel has a density of D, for example, first the non-edge grade dither pattern corresponding to the density D is extracted from the ROM 18 and then the computation to determine which part of the extracted non-edge grade dither pattern formed of nine pixels is to be extracted is carried out. Since the coordinates of the target pixel in this case are (10,10), the pattern of the non-edge grade dither pattern at the position of d(l,l) is allocated to the target pixel. When the extracted non-edge grade dither pattern has such a pattern as is illustrated in FIG. 5A, the pattern of the size of one pixel located at the center thereof (the part enclosed with a thick black frame in the diagram) is allocated to the target pixel (S4).

In the manner just described, the pattern corresponding to the density of the target pixel is selected from the total of 128 kinds of non-edge grade dither patterns, depending on the density of the pixel and the pattern of the size of one pixel at the position corresponding to the target pixel in the selected pattern is used for the allocation (S5).

Here, the rule which governs the layout in dots of the non-edge grade dither pattern in accordance with the density in the present embodiment will be described.

Figure 8:
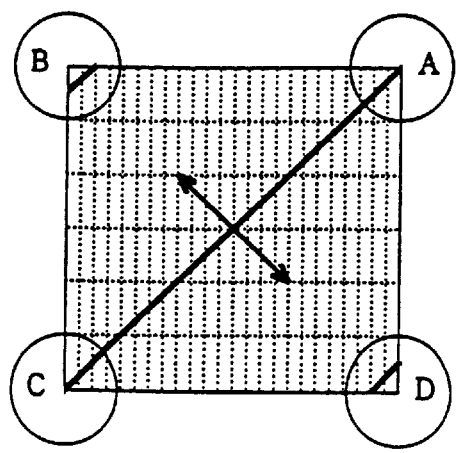
FIG. 8 is a diagram to aid in the description of the state in which dots relative to the density of a pixel read out are laid out in the non-edge grade dither pattern.

The non-edge grade dither pattern is adapted such that it is laid out in dots relative to a screen angle of 45 degrees tilted to the right as illustrated in FIG. 8. The dots are placed along a thick line shown in the diagram as laid out in a manner such that they are enlarged in the directions of arrow marks from the thick line as the center accordingly as the density of the relevant pixel increases. Where the circular part A grows in size and eventually swells past the boundary of the dither pattern in proportion as the line gains in thickness, the dots are placed at the position shown inside the circular part B on the opposite side. By the same token, when the circular part C is enlarged, the dots are placed within the circular part D on the opposite side.

Figure 11:
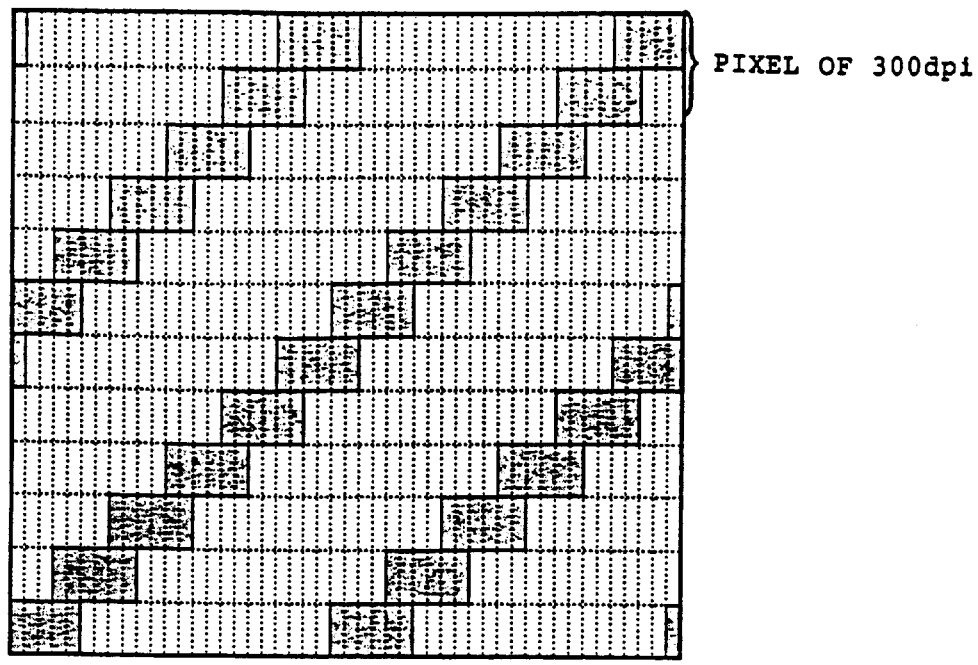
FIG. 11 is a diagram illustrating one example of a printed image obtained when this invention is applied to an image formed solely of a region of a non-edge portion.

FIG. 11 depicts the appearance of a printed image obtained where all the 6×6 read pixels of a relevant image have the same density and correspond to the non-edge portion. It is clearly noted from the diagram that the portion has improved reproducibility of gradation at a sacrifice of resolution.

When the target pixel is determined to correspond to the edge portion (HI as the signal indicating the result of the edge discrimination), the processing for conversion to an edge grade dither pattern corresponding to the density data of the target pixel (one pixel) is carried out. In this case, since the target pixel and the edge grade dither pattern equally have the size of one pixel, the edge grade dither pattern corresponding to the density of the target pixel is simply allocated to that target pixel (S6).

The processing of the step S5 or S6 is carried out on all the pixels which have been read and the data resulting from the conversion thereof is emitted (S7). The printer engine 30 operates and produces a print in accordance with the converted data just mentioned. Specifically, when the dither pattern used for the print happens to be a non-edge grade dither pattern, d(l,m) of this pattern is printed at the position corresponding to the position (X,Y) of the original document to be read. When the dither pattern used for the print happens to be an edge grade dither pattern, this pattern is printed at the position corresponding to the position (X,Y) of the original document to be read.

In addition to allocating the edge grade dither pattern to one pixel of the target pixel as described above, it is conceivable to allocate the edge grade dither pattern to a plurality of pixels. Specifically, when the reading resolution is lower than the printing density, the edge grade dither pattern corresponding to the density of the target pixel may be simply allocated to that target pixel as described above. Conversely, when the printing density is lower than the reading resolution such as when the reading resolution is 1200 dpi×1200 dpi and the printing density is 600 dpi×2400 dpi, for example, the print cannot be produced in the manner described above because the reading resolution is unduly delicate. This hardship may be possibly coped with by regarding 16 pixels of 1200 dpi as one target pixel and subjecting these pixels collectively to the processing for conversion into an edge grade dither pattern in the manner described above. The term "target pixel" as used in the present specification, therefore, means not only the pixel of the minimum pixel unit but also the collection of a plurality of pixels of the minimum pixel units as in the present case.

Here, the rule which governs the layout in dots of the edge grade dither pattern in accordance with the density in the present embodiment will be described below.

Figures 9, 10:
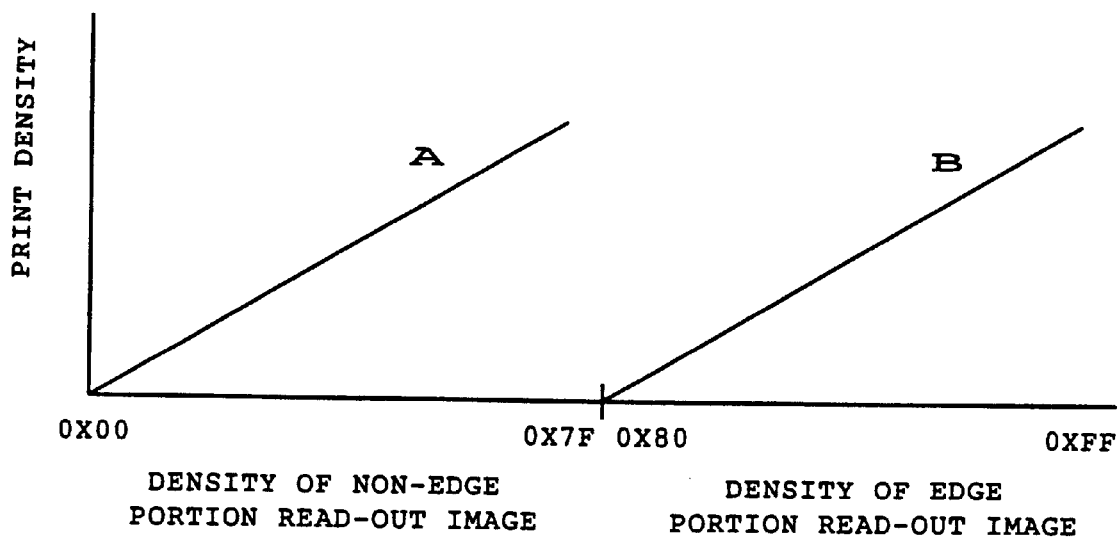
FIG. 9 is a diagram to aid in the description of the state in which dots relative to the density of a pixel read out are laid out in the edge grade dither pattern.
FIG. 10 is a diagram illustrating the relations of the print density severally to the density of an image read out in the non-edge portion and the density of an image read out in the edge portion.

The edge grade dither pattern produces the density of a pixel to be read as divided into 16 sections. The dots forming this pattern are placed sequentially in the order of the ordinal numbers shown in the diagram in accordance as the density increases as illustrated in FIG. 9. When the density level is 4, for example, the dots at 1 through 4 are placed in black (or any of the other colors, Y, M and C).

As clearly noted from this edge grade dither pattern, the dots are laid out relative to a screen angle of 45 degrees tilted to the right. This layout is identical with that which is involved in the case of the non-edge grade dither pattern.

Specifically, the non-edge grade dither pattern and the edge grade dither pattern both use the identical screen angle of 45 degrees tilted to the right. This use of the same screen angle in the two dither patterns under discussion is intended for precluding the possibility of producing a discontinuous image in the boundary between the edge portion and the non-edge portion and consequently giving rise to image noise as experienced when the screen angles used are different. This image noise appears particularly prominently in the region of a photographic image. Though the present embodiment fixes the screen angle at 45 degrees, it goes without saying that this angle of 45 degrees is not critical to the present invention. The screen angles of the non-edge grade dither pattern and the edge grade dither pattern are only required to be identical in one given color and may be varied by the difference in color.

The dither pattern to be applied to a given target pixel is decided by the magnitude of level of the dither pattern to be fixed by the density of the target pixel and the determination of whether the target pixel corresponds to the non-edge portion or the edge portion. Where the dither pattern of the non-edge portion and that of the edge portion are identical in level, the following processing is performed so as to equalize the densities of the prints produced in the two portions mentioned above to the highest possible extent.

Specifically, the print density in the edge portion and that in the non-edge portion are equalized by allowing the straight line A leading the print density from the density of the image read in the non-edge portion (from 0X00 through 0X7F in the dither pattern grade lookup table of FIG. 2) and the straight line B leading the print density from the density of the image read in the edge portion (from 0X80 through 0XFF in the dither pattern grade lookup table of FIG. 2) to assume the same inclination as illustrated in FIG. 10.

This processing is necessary for precluding the possibility that a difference, if any, in the density between the two dither patterns to be applied will emphasize only the part involving the difference and consequently induce the formation of an unnatural image in the affected part where the edge portion and the non-edge portion have an equal density in a photographic region. In the present embodiment, it is not inconceivable that the print density in the edge portion and that in the non-edge portion will be different depending on the density of the image to be read because the print density in the non-edge portion is increased by one step when the density of the image to be read is increased by one step, whereas the print density in the edge portion is increased by one step when the density of the image to be read is increased by 8 steps. The difference of this degree, however, is incapable of exerting an adverse effect on the quality of the image. Thus, the print densities possibly differ as viewed in detail. The processing of equalizing the inclinations in the manner described above is effective further in the sense of curtailing this difference.

Figure 12:
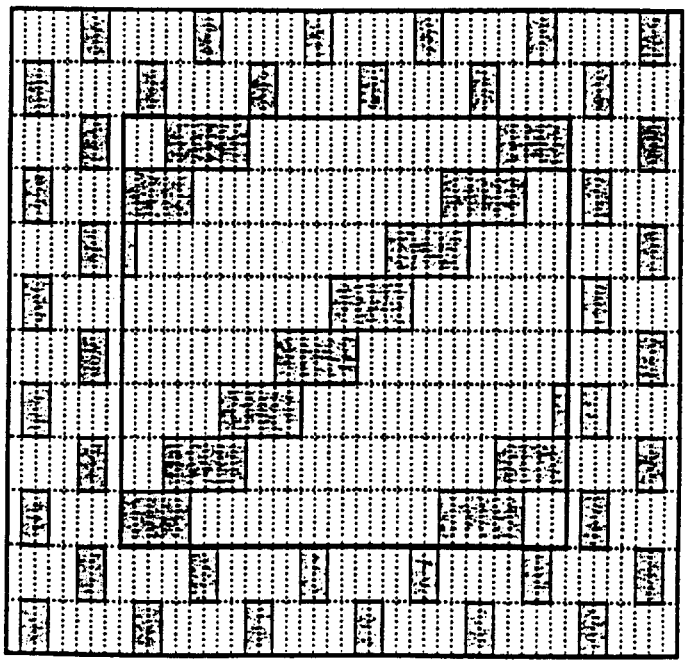
FIG. 12 is a diagram illustrating one example of a printed image obtained when this invention is applied to an image formed of a region of an edge portion and a non-edge portion.

The printed image to be finally obtained by the processing described above has such an appearance as illustrated in FIG. 12, for example. In the diagram, the vertical and lateral lines each of 300 dpi in size are the portions which have been determined by the edge discriminating part 44 to correspond to the edge portion. To this portion, therefore, the edge grade dither pattern such as is illustrated in FIG. 5B is applied. To the remainder of the portion, the non-edge grade dither pattern is applied. When the print is produced as described above, it is enabled to satisfy both the reproducibility of gradation and the resolution. That is to say, the processing enables the edge portion and the fine lines in the image to acquire improved resolution while allowing the non-edge portion of the image to maintain reproducibility of gradation.

The present embodiment specifically adopts the following procedure for the purpose of reproducing 128 levels of gradation with the non-edge grade dither pattern of 6×24 in size.

This procedure consists fundamentally of adopting such a dither pattern as permits reproduction of 144 levels of gradation and meanwhile resorting to a measure of thinning out the number of levels of gradation to be reproduced by blackening two print dots to cope with an increase by one step in the density at a given level of density and consequently attaining the reproduction of 128 levels of gradation instead of blackening one print dot for each increase by one step in the level of density.

Figure 13:
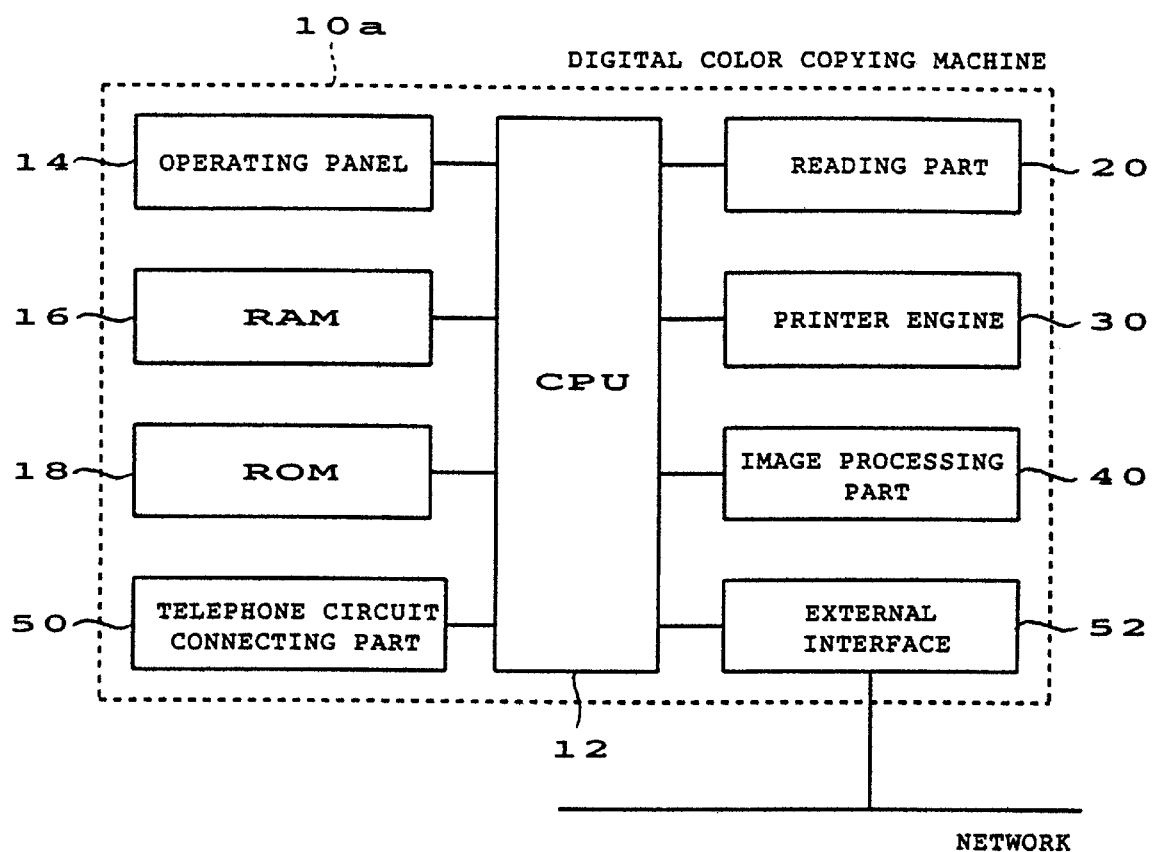
FIG. 13 is a block diagram illustrating schematically the construction of an image processing apparatus according to another embodiment of this invention.

As another embodiment of this invention, the construction endowed with such a complex function as illustrated in FIG. 13 is conceivable.

A digital color copying machine 10*a* illustrated in this diagram, unlike the machine illustrated in FIG. 1, is further provided with a telephone circuit connecting part 50 and an external interface 52.

The telephone circuit connecting part 50 has the function of transmitting and receiving a FAX message for the purpose of enabling the printer engine 30 of the digital color copying machine 10*a* to serve as a FAX engine.

The external interface 52 has the function of enabling an external personal computer to operate the printer engine 30 of the digital color copying machine 10*a* as a printer and allowing an image data read by the reading part 20 to be injected into the personal computer. It is connected to a network.

The construction described above is capable of converting an image data read by the reading part 20 into satisfactory image data and transmitting the refined image data to a personal computer on the network or conversely converting image data from the personal computer into satisfactory image data and allowing the refined image data to be printed and further converting image data read into satisfactory image data and transmitting the refined image data by facsimile.

This invention can be embodied in another construction of the digital color reproducing device which has the scanner part (formed of a CPU, ROM, reading part, image processing part, RAM, and interface) separated from the printer part (formed of a CPU, ROM, printer engine, image processing part, RAM, and interface). This separation type possibly assumes a mode further containing an area gradation processing part, an edge discriminating part, and a RGB→YMCK conversion part in the scanner part or a mode having these components incorporated in the printer.

This invention can be further embodied in yet another construction which has the scanner part (formed of a CPU, ROM, reading part, image processing part, RAM, and interface) and the printer part (formed of a CPU, ROM, printer engine, and interface) separated from a personal computer (formed of a CPU, CDROM drive, FDD, HDD, RAM, ROM, operating part, display part, and interface connected to the scanner part and the printer part) which is connected to both the scanner part and the printer part. This separation type possibly assumes a mode which allows an image read by the scanner part to be introduced into the personal computer and then issued therefrom to the printer. When the program to be executed in the area gradation processing part, edge discriminating part, and RGB→YMCK conversion part is caused to be executed by the personal computer, even the scanner which is barely capable of emitting the data of RGB can be enabled to derive a satisfactory character output from the printer.

Let us assume that a matrix having n*x pieces of binary data capable of realizing reproduction in N (integer) levels of gradation is adopted when the target pixel happens to correspond to the non-edge portion, and a matrix having x pieces of binary data is adopted when the target pixel happens to correspond to the edge portion, that the matrix having n*x pieces of binary data has a size which is A times (in the longitudinal direction) and B times (in the lateral direction) the size of the matrix having x pieces of binary data, that x and n denote integers of not less than 2 satisfying the following formula (1), $$N \leq n^*x \quad (1)$$

and that A and B denote integers of not less than 1 satisfying the following formulas (2) and (3), $$n = A^*B \quad (2)$$

$$A-1 \leq B \leq A+1 \quad (3)$$

and it will prove preferable to select as the value of n as small a numerical value in the ranges satisfying the formulas (1), (2), and (3) as permissible. This is because the damage done to the fineness of the reproduction of an image in the part of intermediate density grows in proportion as the numerical value of n increases. For the purpose of securing satisfactory fineness of the reproduction of image in the part of intermediate density, it is necessary to decrease the numerical value of n to the fullest possible extent.

It is also preferable to satisfy the formula (3), namely to approximate the matrix having the n*x pieces of binary data in shape to the matrix of x pieces of binary data (the two matrixes show perfect congruence when A=B). The close approximation is necessary because the fineness of the reproduction of image in the part of intermediate density grows different in the longitudinal and lateral directions in proportion as the ratio between the longitudinal and lateral directions increases. To attain the uniformity of the fineness between the longitudinal and lateral directions, it is necessary that the formula (3) mentioned above be satisfied.

Further, the entire disclosure of japanese patent application nos. 09-298305 filed on Oct. 30, 1997 and 09-336085 filed on Dec. 5, 1997, including the specification, claims, drawings and summary are incorporated herein by reference in its entirety.

What is claimed is:

1. An image processing apparatus for converting M gradation image data into N gradation image data, wherein N is less than M, said image processing apparatus comprising:
   determining means for determining, based on the M gradation image data of a target region, whether the target region corresponds to an edge portion or to a non-edge portion; and
   processing means for generating, based on the determination by said determining means, the N gradation image data of the target region by using a first matrix in a case where the target region corresponds to the edge portion, and for generating the N gradation image data of the target region by using a part of a second matrix in a case where the target region corresponds to the non-edge portion,
      wherein said first matrix has a first size corresponding to one region of the M gradation image data, and said second matrix has a second size corresponding to a plurality of regions of the M gradation image data.

2. An image processing apparatus in accordance with claim 1, wherein said processing means selects the part of said second matrix among a plurality of parts of said second matrix based on an address of the target region.

3. An image processing apparatus in accordance with claim 1, wherein said determining means comprises calculating means for calculating a differential between the M gradation image data of the target region and the M gradation image data of at least one of a plurality of regions located around the target region.

4. An image processing apparatus in accordance with claim 1, wherein said processing means comprises a memory for storing data for said first matrix and data for said second matrix.

5. An image processing apparatus in accordance with claim 1, wherein a first screen angle of said first matrix and a second screen angle of said second matrix are identical to each other.

6. An image processing apparatus in accordance with claim 1, wherein the target region corresponds to one pixel of the M gradation image data.

7. An image processing apparatus in accordance with claim 1, wherein the target region corresponds to a plurality of pixels of the M gradation image data.

8. An image processing apparatus for converting M gradation image data into N gradation image data, wherein N is less than M, said image processing apparatus comprising:
   determining means for determining, based on the M gradation image data of a target region, whether the target region corresponds to an edge portion or to a non-edge portion; and
   processing means for generating, based on the determination by said determining means, the N gradation image data of the target region by using a first matrix in a case where the target region corresponds to the edge portion, and for generating the N gradation image data of the target region by using a part of a second matrix in a case where the target region corresponds to the non-edge portion,
      wherein said first matrix is a first dither matrix, and said second matrix is a second dither matrix,
      wherein said first dither matrix has a size corresponding to one region of the M gradation image data, and said second dither matrix has a size corresponding to a plurality of regions of the M gradation image data.

9. An image processing method for converting M gradation image data into N gradation image data, wherein N is less than M, said image processing method comprising the steps of:

(a) determining, based on the M gradation image data of a target region, whether the target region corresponds to an edge portion or to a non-edge portion; and selectively (b-1) generating the N gradation image data of the target region by using a first matrix in a case where the target region corresponds to the edge portion in accordance with the determination in the step (a); and (b-2) selecting one of a plurality of parts of a second matrix and generating the N gradation image data of the target region by using the selected part of said second matrix in a case where the target region corresponds to the non-edge portion in accordance with the determination in the step (a), wherein said first matrix has a first size corresponding to one region of the M gradation image data, and said second matrix has a second size corresponding to a plurality of regions of the M gradation image data.

10. An image processing method in accordance with claim 9, wherein the selection in the step (b-2) is executed based on an address of the target region.

11. An image processing method in accordance with claim 9, the step (a) including:

(a-1) calculating a differential between the M gradation image data of the target region and the M gradation image data of at least one of a plurality of regions located around the target region; and (a-2) determining whether the M gradation image data of the target region corresponds to the edge portion or to the non-edge portion based on the differential obtained in the step (a-1).

12. An image processing method in accordance with claim 9, wherein the target region corresponds to one pixel of the M gradation image data.

13. An image processing method in accordance with claim 9, wherein the target region corresponds to a plurality of pixels of the M gradation image data.

14. An image processing method in accordance with claim 9, wherein said first matrix is a first dither matrix, and said second matrix is a second dither matrix.

15. A storage containing a computer readable program with which a computer can execute a process including the steps of:

(a) determining, based on M gradation image data of a target region, whether the target region corresponds to an edge portion or to a non-edge portion; and selectively (b-1) generating N gradation image data of the target region by using a first matrix in a case where the target region corresponds to the edge portion in accordance with the determination in the step (a); and (b-2) selecting one of a plurality of parts of a second matrix and generating the N gradation image data of the target region by using the selected part of said second matrix in a case where the target region corresponds to the non-edge portion in accordance with the determination in the step (a), wherein N is less than M, wherein said first matrix has a first size corresponding to one region of the M gradation image data, and said second matrix has a second size corresponding to a plurality of regions of the M gradation image data.

16. A storage in accordance with claim 15, wherein the selection in the step (b-2) is executed based on an address of the target region.

17. A storage in accordance with claim 15, the step (a) including:

(a-1) calculating a differential between the M gradation image data of the target region and the M gradation image data of at least one of a plurality of regions located around the target region; and (a-2) determining whether the M gradation image data of the target region corresponds to the edge portion or to the non-edge portion based on the differential obtained in the step (a-1).

18. A storage in accordance with claim 15, wherein the target region corresponds to one pixel of the M gradation image data.

19. A storage in accordance with claim 15, wherein the target region corresponds to a plurality of pixels of the M gradation image data.

20. A storage in accordance with claim 15, wherein said first matrix is a first dither matrix, and said second matrix is a second dither matrix.

21. An image processing apparatus for converting M gradation image data into N gradation image data, wherein N is less than M, said image processing apparatus comprising:

determining means for determining an attribute of the M gradation image data of a target region, and for generating composite data of the target region from the M gradation image data and the attribute of the target region; and processing means for generating, based on the composite data of the target region, the N gradation image data of the target region by using a selected one of a plurality of matrixes, wherein said processing means selects the selected one of the plurality of matrixes based on the attribute included in the composite data of the target region, wherein each of the plurality of matrixes is a dither matrix, wherein each of the plurality of dither matrixes has a size which is different from sizes of the other matrixes.

22. An image processing apparatus in accordance with claim 21, wherein said determining means determines whether the M gradation image data of the target region corresponds to an edge portion or to a non-edge portion.

23. An image processing apparatus in accordance with claim 22, wherein said determining means comprises calculating means for calculating a differential between the M gradation image data of the target region and the M gradation image data of at least one of a plurality of regions located around the target region.

24. An image processing apparatus in accordance with claim 21, wherein the target region corresponds to one pixel.

25. An image processing apparatus in accordance with claim 21, wherein the target region corresponds to a plurality of pixels.

26. An image processing method for converting M gradation image data into N gradation image data, wherein N is less than M, said image processing method comprising the steps of:

(a) determining an attribute of the M gradation image data of a target region;

(b) generating composite data of the target region from the M gradation image data and the attribute of the target region;

(c) selecting one of a plurality of matrixes based on the attribute included in the composite data of the target region; and (d) generating, based on the composite data of the target region, the N gradation image data of the target region by using the matrix selected in the step (c), wherein each of the plurality of dither matrixes has a size which is different from sizes of the other matrixes.

27. An image processing method in accordance with claim 26, wherein the step (a) determines whether the M gradation image data of the target region corresponds to an edge portion or to a non-edge portion.

28. An image processing method in accordance with claim 27, wherein the step (a) includes:

(a-1) calculating a differential between the M gradation image data of the target region and the M gradation image data of at least one of a plurality of regions located around the target region; and (a-2) determining whether the M gradation image data of the target region corresponds to the edge portion or to the non-edge portion based on the differential obtained in the step (a-1).

29. An image processing method in accordance with claim 26, wherein the target region corresponds to one pixel.

30. An image processing method in accordance with claim 26, wherein the target region corresponds to a plurality of pixels.

31. An image processing method in accordance with claim 26, wherein each of the plurality of matrixes is a dither matrix.

32. An image data converting method for converting image data of multi-valued data into image data of binary data equivalent to x times the image data of multi-valued data, comprising the steps of:

determining whether a target pixel of the image data of multi-valued data corresponds to an edge portion or a non-edge portion; and converting image data of the target pixel into image data which is a part (1/n) of image data of a matrix having n*x pieces of binary data for reproducing N levels of gradation in response to a density of image data of the target pixel in a case where the target pixel corresponds to the non-edge portion, and converting image data of the target pixel into image data of a matrix having x pieces of binary data for reproducing x levels of gradation in response to a density of image data of the target pixel in a case where the target pixel corresponds to the edge portion;

wherein N denotes an integer, x and n each denotes an integer of not less than 2, and the values of N, x, and n satisfy the following formula:

N≦n*x.

33. An image data converting method in accordance with claim 32, wherein said matrix having n*x pieces of binary data has a size which is A times, in a longitudinal direction, and B times, in a lateral direction, a size of said matrix having x pieces of binary data, wherein A and B denote integers of not less than 1 satisfying the following formulas:

n=A*B

A−1≦B≦A+1.

34. An image data converting method in accordance with claim 33, wherein a screen angle of said matrix having n*x pieces of binary data and a screen angle of said matrix having x pieces of binary data are identical to each other.

35. An image data converting apparatus for converting image data of multi-valued data into image data of binary data equivalent to x times the image data of multi-valued data, comprising:

a determining part for determining whether a target pixel of the image data of multi-valued data corresponds to an edge portion or a non-edge portion; and an area gradation processing part for converting image data of the target pixel into image data which is a part (1/n) of image data of a matrix having n*x pieces of binary data for reproducing N levels of gradation in response to a density of image data of the target pixel in a case where it is determined by said determining part that the target pixel corresponds to the non-edge portion, and for converting image data of the target pixel into image data of a matrix having x pieces of binary data for reproducing x levels of gradation in response to a density of image data of the target pixel in a case where it is determined by said determining part that the target pixel corresponds to the edge portion;

wherein N denotes an integer, x and n each denotes an integer of not less than 2, and the values of N, x, and n satisfy the following formula:

N≦n*x.

36. An image data converting apparatus in accordance with claim 35, wherein said matrix having n*x pieces of binary data has a size which is A times, in a longitudinal direction, and B times, in a lateral direction, a size of said matrix having x pieces of binary data, wherein A and B denote integers of not less than 1 satisfying the following formulas:

n=A*B

A−1≦B≦A+1.

37. An image data converting apparatus in accordance with claim 36, wherein a screen angle of said matrix having n*x pieces of binary data and a screen angle of said matrix having x pieces of binary data are identical to each other.

38. A computer program product for converting image data of multi-valued data into image data of binary data equivalent to x times the image data of multi-valued data, said computer program product causing a computer to execute a process including the steps of:

determining whether a target pixel of the image data of multi-valued data corresponds to an edge portion or a non-edge portion; and converting image data of the target pixel into image data which is a part (1/n) of image data of a matrix having n*x pieces of binary data for reproducing N levels of gradation in response to a density of image data of the target pixel in a case where the target pixel corresponds to the non-edge portion, and converting image data of the target pixel into image data of a matrix having x pieces of binary data for reproducing x levels of gradation in response to a density of image data of the target pixel in a case where the target pixel corresponds to the edge portion;

wherein N denotes an integer, x and n each denotes an integer of not less than 2, and the values of N, x, and n satisfy the following formula:

N≦n*x.

39. A computer program product in accordance with claim 38, wherein said matrix having n*x pieces of binary data has a size which is A times, in a longitudinal direction, and B times, in a lateral direction, a size of said matrix having x pieces of binary data, wherein A and B denote integers of not less than 1 satisfying the following formulas:

$n = A*B$ $A-1 \leq B \leq A+1$.

40. A computer program product in accordance with claim 39, wherein a screen angle of said matrix having n*x pieces of binary data and a screen angle of said matrix having x pieces of binary data are identical to each other.

* * * * *